US006763091B2

(12) United States Patent
Shimada (10) Patent No.: US 6,763,091 B2
(45) Date of Patent: Jul. 13, 2004

(54) SERVICE SYSTEM FOR PROVIDING BY CONFIRMING CALLER TELEPHONE NUMBER, SERVICE METHOD AND MEDIUM

(75) Inventor: Yukio Shimada, Tokyo (JP)

(73) Assignee: Bell Net Corp., Tokyo (JP)

( * ) Notice: Subject to any disclaimer, the term of this patent is extended or adjusted under 35 U.S.C. 154(b) by 0 days.

(21) Appl. No.: 10/261,210

(22) Filed: Sep. 30, 2002

(65) Prior Publication Data

US 2003/0053606 A1 Mar. 20, 2003

Related U.S. Application Data

(63) Continuation of application No. PCT/JP01/08108, filed on Sep. 18, 2001.

(51) Int. Cl.[7] .............................................. H04M 1/64
(52) U.S. Cl. ...................... 379/88.19; 379/72; 379/76; 379/88.07
(58) Field of Search ..................... 379/72, 76, 88.07, 379/88.11, 88.12, 88.19, 88.2, 88.21, 207.15, 201.01, 201.11

(56) References Cited

U.S. PATENT DOCUMENTS

| | | | | | |
|---|---|---|---|---|---|
| 5,325,421 | A | * | 6/1994 | Hou et al. | 379/67 |
| 5,652,789 | A | * | 7/1997 | Miner et al. | 379/201.01 |
| 5,884,262 | A | * | 3/1999 | Wise et al. | 704/270 |
| 5,946,386 | A | * | 8/1999 | Rogers et al. | 379/265 |
| 5,982,774 | A | * | 11/1999 | Foladare et al. | 370/401 |

FOREIGN PATENT DOCUMENTS

JP          10 164266         6/1998

* cited by examiner

*Primary Examiner*—Allan Hoosain
(74) *Attorney, Agent, or Firm*—Alston & Bird LLP

(57) ABSTRACT

A service system for providing a service to a user comprises an application accept unit (4) for accepting an application for registration from a terminal (1) together with a telephone number of the terminal, a recording module (5) for recording the telephone number as an application telephone number, a telephone call receiving unit (6) for receiving a telephone call, a comparing unit (6) for comparing a caller telephone number of the received telephone call with the application telephone number, and a registration module (5) for registering, when the caller telephone number is coincident with the application telephone number, the application telephone number as a registered telephone number.

11 Claims, 5 Drawing Sheets

FIG.3

| APPLICATION NUMBER INFORMATION TBALE |
|---|
| MOBILE TERMINAL ID |
| APPLICATION TELEPHONE NUMBER |
| AUTHENTICATION FLAG |
| APPLICATION DATE |

FIG.4

| MEMBER INFORMATION TABLE |
|---|
| MOBILE TERMINAL ID |
| REGISTERED TELEPHONE NUMBER |
| OTHER INDIVIDUAL ATTRIBUTE INFORMATION |

FIG.5

| VOICE SERVICE INFORMATION TABLE |
|---|
| REGISTERED TELEPHONE NUMBER |
| MESSAGE NUMBER |
| REPRODUCTION FLAG |
| REPRODUCTION DATE |

SERVICE SYSTEM FOR PROVIDING BY CONFIRMING CALLER TELEPHONE NUMBER, SERVICE METHOD AND MEDIUM

CROSS-REFERENCE TO RELATED APPLICATION

This is a continuation of International Patent Application PCT/JP 01/08108, filed on Sep. 18, 2001, incorporated herein by reference.

BACKGROUND OF THE INVENTION

1. Technical Field

The present invention relates to a technology of providing services to users via networks.

2. Background Art

It has been possible to enjoy various categories of services provided on Web sites on the Internet over the recent years. Further, with sophisticated functions of mobile telephones and PHS(Personal Handyphone System), the users can receive the services from sites for mobile terminals without being limited to locations. These services are, e.g., a service for distributing music and voices desired by the user, a service for displaying e-mails, a fortune telling service, a service for displaying maps and so forth.

According to the prior arts, however, in the case of receiving the services described above, normally the user registers a membership to a service provider and can receive the service after the user has been authenticated as a registered member. There arise the following problems inherent in a system for providing the service to the registered member.

(1) The user who registered his or her membership was required to input a membership number, etc., each time the user had received the service. Accordingly, in the case of using the mobile telephone or PHS, it was not user-friendly, and the input operation was troublesome.

(2) It was impossible to prevent such a fraud use that the membership number of the same member had been shared among a plurality of users. Therefore, the service provider could not completely collect membership fees that would otherwise have been collected from the plurality of members. Further, this type of fraud use made it impossible to ensure information security.

(3) There has been a service in which the user operates the mobile telephone in accordance with a voice guidance transmitted from a data center; however, the voice guidance was not clear to understand, and the operation was not user-friendly.

SUMMARY OF THE INVENTION

It is an object of the present invention, which was devised in view of the problems inherent in the prior art, to simultaneously attain ensuring information security and an enhancement of usability in providing services to mobile terminals.

To accomplish the above object, the present invention adopts the following means.

Namely, a service system for providing a service to a user according to the present invention comprises an application accept unit (4) for accepting an application for registration from a terminal (1) together with a telephone number of the terminal (1), a recording module (5) for recording the telephone number as an application telephone number, a telephone call receiving unit (6) for receiving a telephone call, a comparing unit (6) for comparing a caller telephone number of the received telephone call with the application telephone number, and a registration module (5) for registering, when the caller telephone number is coincident with the application telephone number, the application telephone number as a registered telephone number.

The user may, after inputting the telephone number of the user's own terminal (1), telephone the telephone call receiving unit (6). The telephone call receiving unit (6) obtains the telephone number of the terminal (1) by utilizing, for example, a caller telephone number announce service of a telephone company. With this scheme, the service system recognizes a receipt of the telephone call from the user who made an application. As a result, the registration module (5) registers this telephone number formally as a registered telephone number.

Note that the recording module (5) and the registration module (5) may be set in the form of, e.g., different tables within the same database system and may also be actualized in different database systems. The terminal (1) of the user is, for instance, a mobile telephone, PHS, a fixed telephone, and so on. Further, the caller telephone number may also be referred to as a call originator telephone number.

Preferably, the service system further comprises a request accept unit (4) for accepting a service providing request given from the terminal (1), and a service providing unit (6) for providing, when the caller telephone number of the telephone call received by the telephone call receiving unit (6) after accepting the request is coincident with the registered telephone number of the terminal (1), the service requested.

The user specifies a category of the service, then requests the request accept unit (4) to provide the service and, thereafter, may telephone the telephone call receiving unit (6). The telephone call receiving unit (6) obtains the telephone number of the user by utilizing, e.g., a caller telephone number announce service of a telephone company. With this scheme, the service system recognizes a receipt of the telephone call from the user who made an application. As a result, the service system provides the service requested.

Preferably, the service is a service for providing sound or voices to the terminal (1).

Preferably, the service system further comprises an identifying information obtaining unit for obtaining terminal identifying information for identifying the terminal (1), wherein the recording module (5) records the application telephone number together with the terminal identifying information, and the registration module (5) registers the registered telephone number together with the terminal identifying information.

Preferably, the service system further comprises a request recording module (5) for recording a service providing request given from the terminal (1), wherein the request accept unit (4) obtains from the identifying information obtaining unit the terminal identifying information of the terminal making the service providing request, obtains the registered telephone number of the terminal (1) from the registration module (5) on the basis of the terminal identifying information, and makes the request recording module record the request given from the terminal together with the registered telephone number, and the service providing unit (6) provides the requested service when the caller telephone number of the call received by the telephone call receiving unit (6) is coincident with any one of the registered telephone numbers recorded on the request recording module (5).

According to the present service system, the terminal identifying information may be used as a membership number of the user. The identifying information obtaining unit may simply obtain this membership number without inputting by the user. Therefore, the user has no necessity of inputting the membership number when applying for a registration and making a service providing request.

Further, a service method of providing a service to a user according to the present invention comprises accepting an application for registration from a terminal (1) together with a telephone number of the terminal, recording the telephone number as an application telephone number, receiving a telephone call, comparing a caller telephone number of the received telephone call with the application telephone number, and registering, when the caller telephone number is coincident with the application telephone number, the application telephone number as a registered telephone number.

Note that this service method can be actualized by making a computer execute the respective steps described above. Further, according to the present invention, there is provided a program for making the computer actualize any of the functions described above. Moreover, according to the present invention, there is provided a readable-by-computer recording medium recorded with such a program.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are given as fixed type recording mediums within the computer.

As explained above, according to the present invention, the user can easily be surely authenticated and registered as a service receiver. Further, the user can be easily authenticated with security when providing the service, and can be provided with the service.

Moreover, there exists only one mobile terminal 1 having the same telephone number, and hence, in the system for registering the membership and so forth, it is possible to reduce fraud use such as sharing a membership number among a plurality of members and so on. When utilizing the service, a usability and an operability for the user are improved.

DETAILED DESCRIPTION OF THE PREFERRED EMBODIMENT

An information system in a preferred embodiment of the present invention will hereinafter be explained with reference to FIGS. 1 through 7. The present information system provides various categories of services to terminals of members via a public network. Herein, the member is a user who registered a telephone number etc of the terminal in this information system.

<Outline of Functions>

Figure 1:
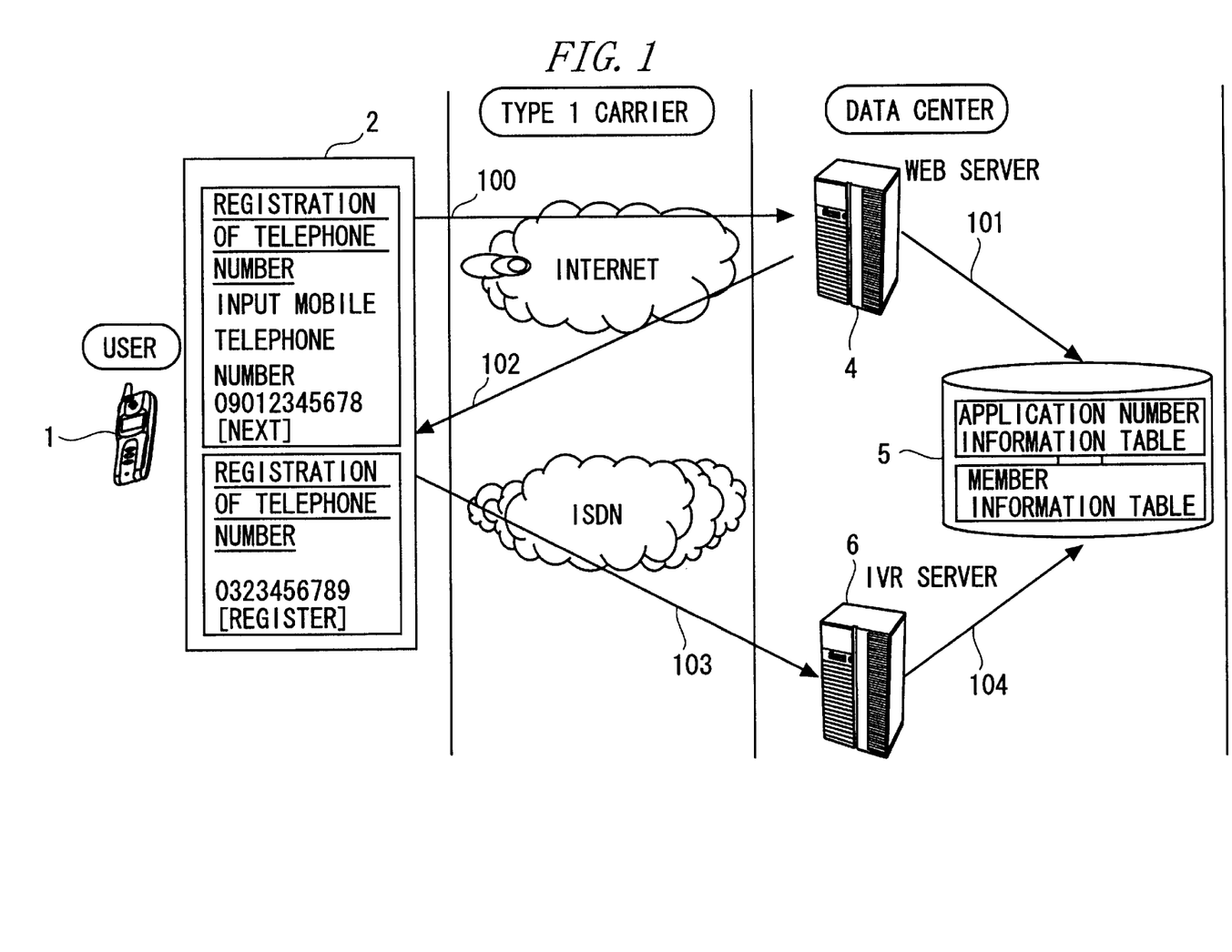
FIG. 1 is a diagram showing a system architecture of an information system and an outline of a membership registration process in an embodiment of the present invention.

FIG. 1 shows a system architecture of the present information system and a membership registration process. This information system includes a Web server 4 for providing Web sites, an IVR (Interactive Voice Response) server 6 for providing voice services to the members, and a database 5 for managing information on the members and information on the services.

The Web server 4 receives accesses from the users (the members and unregistered persons) via the Internet, and displays Web sites on mobile terminals 1 of the users. The Web server is a typical computer having a communication function based on HTTP (HyperText Transfer Protocol), of which an architecture and operation are broadly known.

The IVR server 6 receives a call from the user via ISDN (Integrated Services Digital Network), then executes a process of authenticating the user and provides the voice service to the user. The IVR server 6 is a computer having a voice reproducing function and a telephone response function, the architecture and operation of which are broadly known.

The database 5 serves to manage the information on the registered members and the information on the services to be provided in linkage with the Web server 4 and the IVR server 6. The database 5 is a computer system having a hard disk, the architecture and operation of which are broadly known.

The user accesses a data center via the Internet and ISDN by use of the user's own mobile terminal 1 and is thus supplied with the various categories of services.

FIG. 1 shows the Web server 4, the IVR server 6 and the database 5 as different computers. Two or more of these computers may be configured as one single computer system. Further, any one or more of the Web server 4, the IVR server 6 and the database 5 may also be configured as a system configured by a plurality of computers.

Next, a membership registration process will be outlined referring to FIG. 1. In the membership registration process, at first, the user accesses the data center via the Internet by use of the user's own mobile terminal 1. At this time, the Web server 4 obtains, based on HTTP (HyperText Transfer Protocol), a mobile terminal ID of the mobile terminal 1 accessing thereto. This mobile terminal ID is used as a membership number in this information system.

Next, the Web server 4 of the data center displays, on a screen 2 of the mobile terminal 1, a message [Input the mobile telephone number] that prompts the user to input a telephone number for registering the membership.

The user inputs the telephone number of the user's own mobile terminal 1 from this mobile terminal 1 as the message given from the data center indicates (see arrow 100).

The Web server 4 of the data center records the inputted telephone number as an application telephone number together with the mobile terminal ID described above in an application number information table of the database 5 (see arrow 101). Further, the Web server 4 displays an accept telephone number of the data center on the mobile terminal 1 of the user (see arrow 102).

Thereafter, the user disconnects from the data center via the Internet. Then, the user dials the accept telephone number of the data center (see arrow 103). The IVR server 6 at the data center answers the call of this accept telephone number.

The IVR server 6 obtains the caller's telephone number of the received call by utilizing a telephone number announce service of the ISDN system. Then, the IVR server 6 compares the caller's telephone number with the application telephone number recorded in the application number information table of the database 5 (see arrow 104).

When the application telephone number coincident with the caller's telephone number is registered in the database 5, the IVR server 6 writes this application telephone number as a formal membership registered telephone number together with the mobile terminal ID in the membership information table of the database 5.

Figure 2:
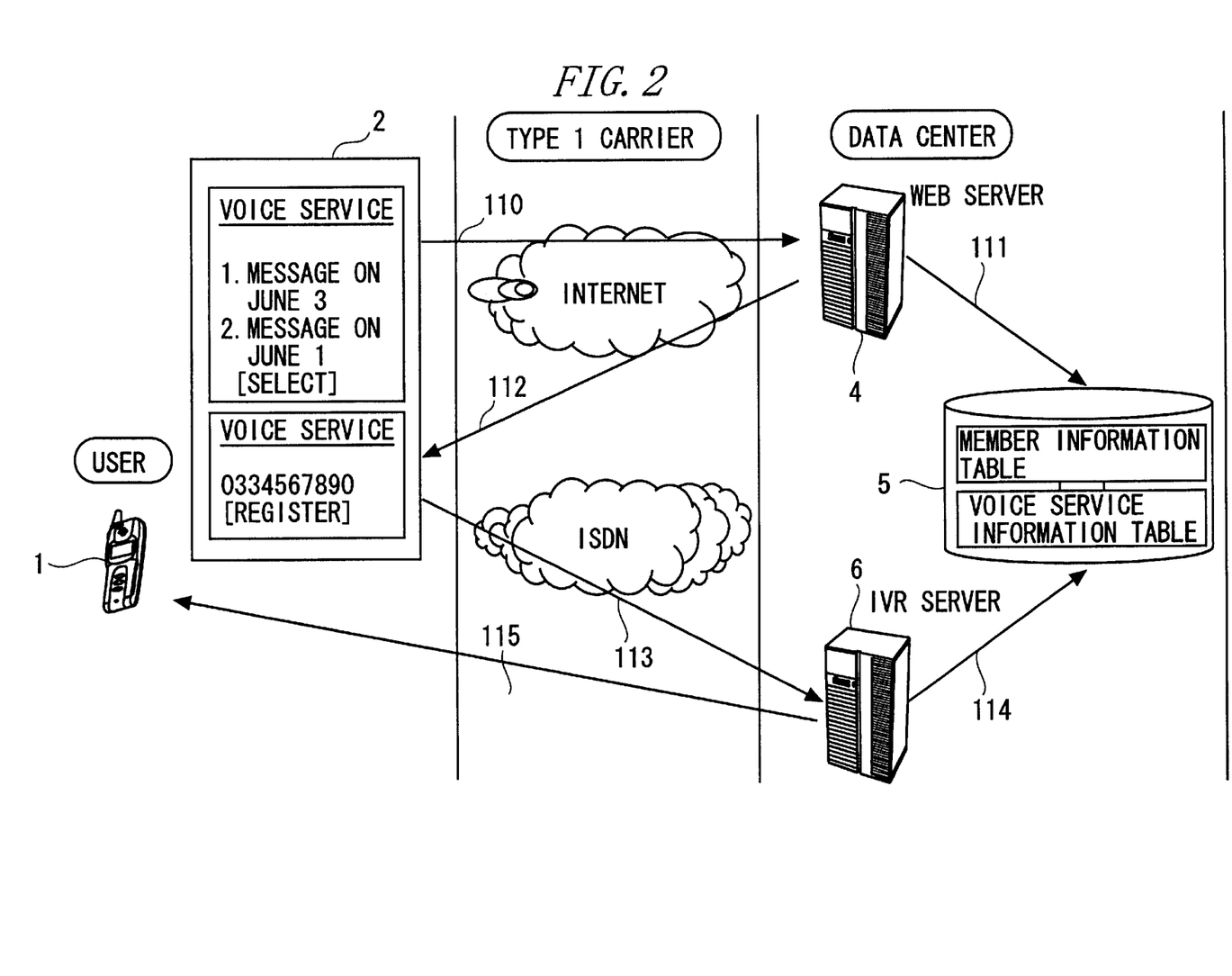
FIG. 2 is a diagram showing an outline of a voice service providing process.

A voice service providing process will be outlined referring to FIG. 2. In this process, to start with, the user as the member accesses the Web site of the data center via the Internet from on the mobile terminal 1.

Then, the Web server 4 displays a voice service menu on the screen 2 of the mobile terminal 1. For instance, in FIG. 2, options such as [1. Message on June 3], [2. Message on June 1], etc., are displayed.

The user selects a necessary message from the voice service menu displayed on the screen 2. At this time, the Web server 4 obtains, based on HTTP, the mobile terminal ID of the on-access mobile terminal 1 (see arrow 110). Then, the Web server 4 searches the membership information table of the database 5 with the mobile terminal ID serving as a membership number, thereby obtaining the registered telephone number of this member.

Then, the Web server 4 writes the registered telephone number of the member concerned and a message number of the selected message in the voice service information table (see arrow 111). Thereafter, the Web server 4 displays the accept telephone number of the data center on the mobile terminal 1 of the user (see arrow 112).

The user, after making the selection from the menu, telephones the data center (see arrow 113). At the data center, the IVR server 6 receives a caller's telephone number of the call received. Then, the IVR server 6 compares the caller's telephone number with the registered telephone number registered in the voice service information table of the database 5 (see arrow 114).

The IVR server 6, if the caller's telephone number of the call received is coincident with the registered telephone number registered in the voice service information table, obtains a message number recorded together with this registered telephone number. Then, the voice message selected based on this message number is reproduced and then provided to the user (see arrow 115).

<Data Structure>

Figure 3:
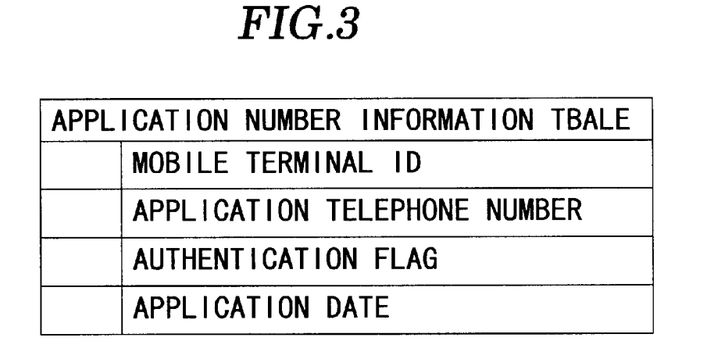
FIG. 3 is a diagram showing a data structure of an application number information table.
Figure 4:
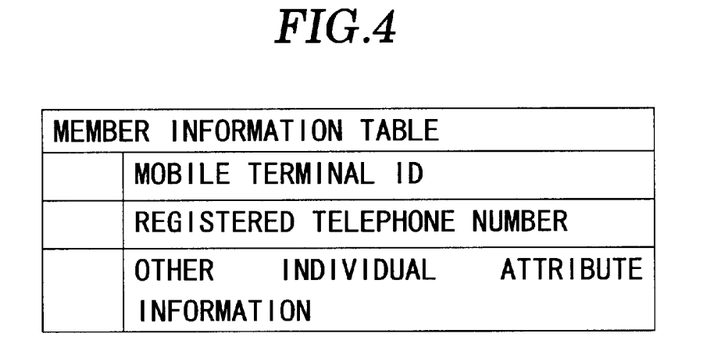
FIG. 4 is a diagram showing a data structure of a member information table.
Figure 5:
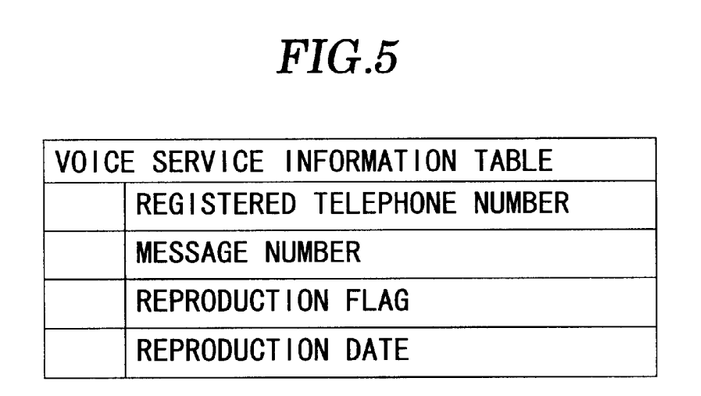
FIG. 5 is a diagram showing a data structure of a voice service information table.

FIGS. 3 through 5 show data structures of tables retained in the database 5. FIG. 3 illustrates a data structure of an application number information table. FIG. 3 shows one record (for one user) (which is hereinafter the same in FIGS. 4 and 5) in the application number information table.

This application number information table is a table for recording that the user can be authenticated through a caller number notification when the user applies for registering the membership. As shown in FIG. 3, this table has a "mobile terminal ID" field, an "application telephone number" field, an "authentication flag" field and an "application date" field.

The mobile terminal ID is defined as a code (a character string) for identifying the mobile terminal 1 used by the member concerned. Each of mobile telephone companies allocates a unique character string to the mobile terminal 1 of the user. This mobile terminal ID is recorded on a ROM of the mobile terminal 1. When the user accesses the Web server 4 through the mobile terminal 1, the Web server 4 obtains the mobile terminal ID thereof. The mobile terminal ID is used as a membership number in the present information system.

The application telephone number is a telephone number, applied by the user, of the mobile terminal 1. When the application telephone number can be authenticated through the caller number notification, a completion of the authentication is set in the "authentication flag" field. The application date is a date/time when applied.

FIG. 4 shows a data structure of a member information table. The member information table is a table for recording pieces of information on the formally registered members. As shown in FIG. 4, the member information table contains a mobile terminal ID, a registered telephone number and individual attribute information on the member concerned.

The mobile terminal ID has already been explained in FIG. 3, and hence its explanation is omitted.

The registered telephone number is a telephone number of the mobile terminal 1 thereof. Other individual attributes are, for example, a name, an address, an age, a distinction of sex, a date of user's birth and so on. The user inputs these individual attributes when applying for the registration. The information presented by the user may also be inputted at the data center.

FIG. 5 shows a data structure of a voice serve information table. The voice service information table is an operation table for storing a message number of the message selected on the mobile terminal 1 when in the voice service.

The voice service information table has a "registered telephone number" field, a "message number" field, a "reproduction flag" field and a "reproduction date" field.

The message number is a message number of the voice message in the menu that is selected by the user. The message number is, when the user makes the menu selection, written to the database 5 by the Web server 4.

The reproduction flag is a flag indicating that the reproduction is completed. The reproduction date is a date/time when the reproduction is completed. The reproduction completion flag and the reproduction completion date are, when the reproduction is completed, set by the IVR server.

<Operation>

Figure 6:
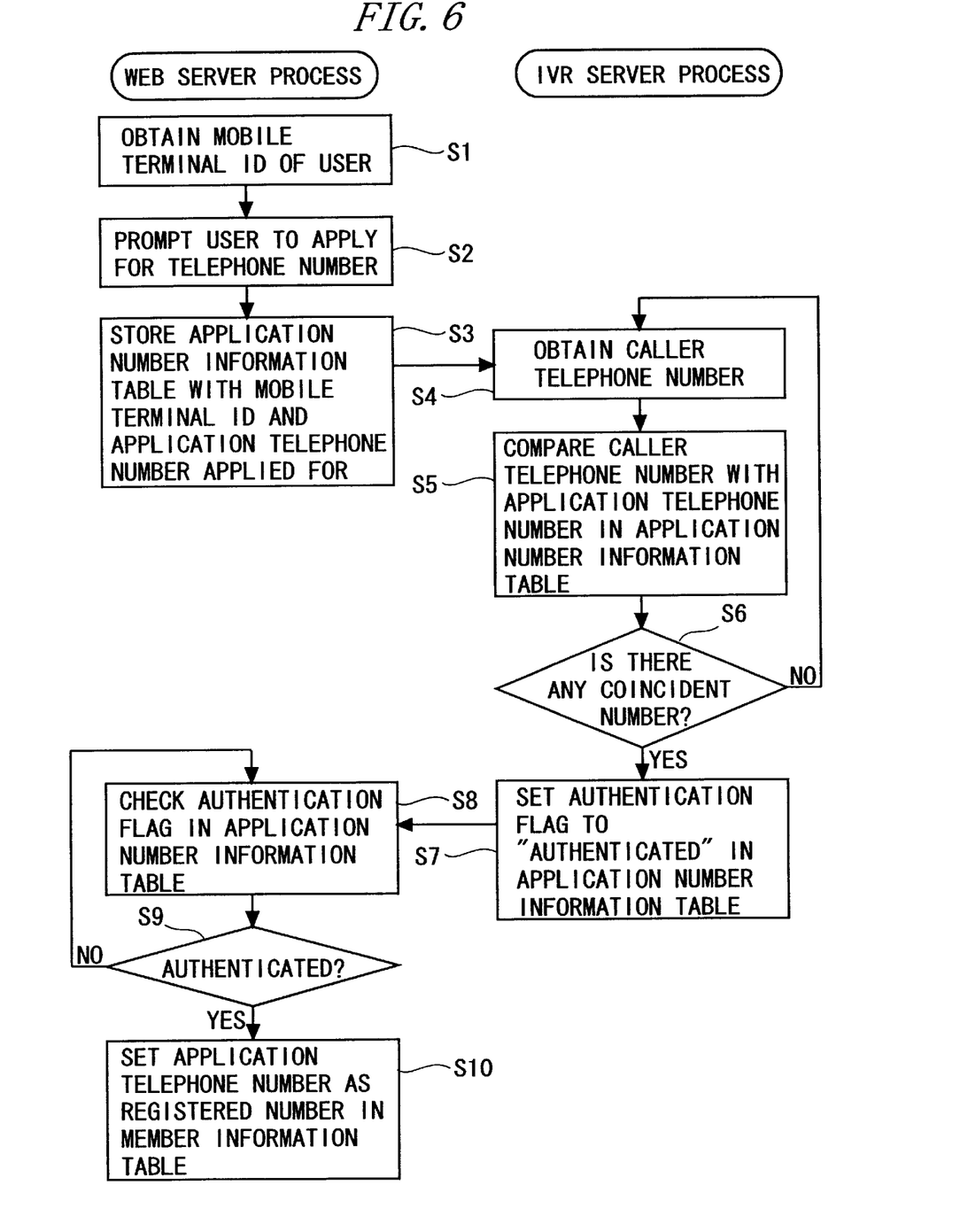
FIG. 6 is a flowchart showing a membership registration process in the information system.

FIG. 6 shows a flow of the membership registration process. To begin with, the user accesses the Web site provided by the Web server 4 through the mobile terminal 1. At this time, the Web server 4 obtains the mobile terminal ID of the user (S1).

The user applies for a telephone number of the mobile terminal 1 on the Web site (S2). Then, the Web server 4 stores the application number information table with the mobile terminal ID and the telephone number applied for (which will hereinafter be called an application telephone number) (S3).

The IVR server 6 normally waits for receiving a call. When receiving the call, the IVR server 6 obtains a telephone number of the caller (which will hereinafter be referred to as a caller's telephone number) in the caller telephone number announce service (S4). Next, the IVR server 6 compares the caller's telephone number with the application telephone number in the application number information table (S5). Then, the IVR server 6 judges whether there exists the application telephone number coincident with the caller's telephone number of the call received (S6).

When the application telephone number is coincident with the caller's telephone number, the IVR server 6 sets the authentication flag to "authenticated" in the application number information table (S7). Further, the IVR server 6 sets an authentication date/time.

On the other hand, the Web server 4 monitors the authentication flag in the application number information table. Then, the Web server 4 checks whether the authentication has been set to "authenticated" (S8, S9).

When the authentication flag has been set to "authenticated", the Web server 4 sets the application telephone number as a registered telephone number in the member information table (S10).

Figure 7:
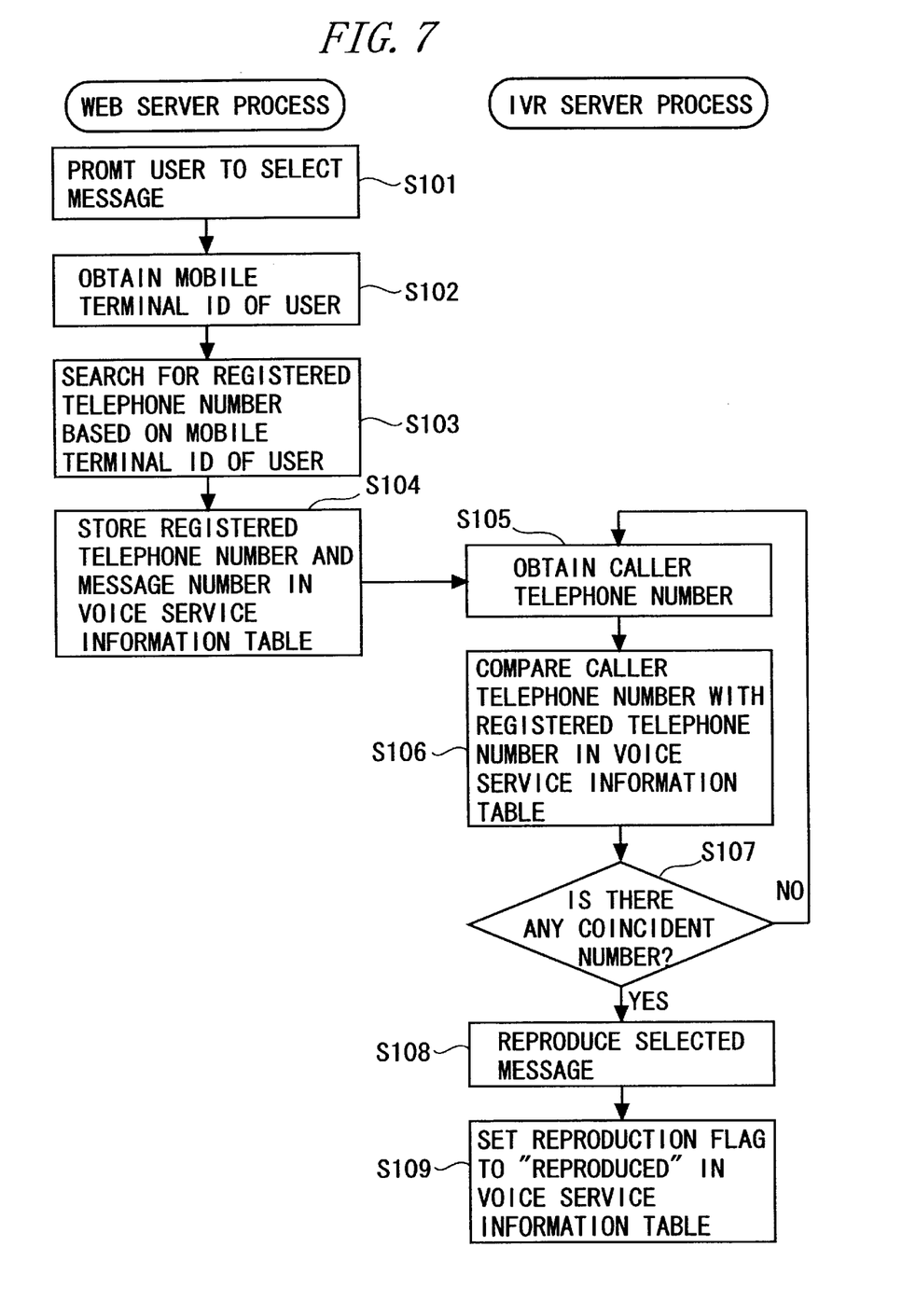
FIG. 7 is a flowchart showing the voice service providing process in the information system.

FIG. 7 shows a flow of a voice service providing process. In this process, the user at first accesses the Web site provided by the Web server 4 through the mobile terminal 1. Then, the Web server 4 displays a voice service message menu on the mobile terminal 1 of the user.

Next, the user selects a message displayed on the Web site (S101). At this time, the Web server 4 obtains the mobile terminal ID of the user (S102). Then, the Web server 4 searches the member information table on the basis of the mobile terminal ID, thereby obtaining the registered telephone number of the user (S103). Subsequently, the Web server 4 stores the voice service information table with the registered telephone number of the user and a message number of the selected message (S104).

Next, the user dials the accept telephone number of the data center. The IVR server 6 normally waits for receiving a call. When receiving the call, the IVR server 6 obtains a telephone number of the caller as a call originator in the caller telephone number announce service (S105).

Next, the IVR server 6 compares the caller's telephone number with the registered telephone number in the voice service information table (S106). Then, the IVR server 6 judges whether the registered telephone number is coincident with the caller's telephone number in the voice service information table (S107).

When the registered telephone number is coincident with the caller's telephone number in the voice service information table, the IVR server 6 obtains the message number recorded together with this registered telephone number. Then, the IVR server 4 reproduces the message selected based on the message number (S108). Subsequently, the IVR server 4 sets a reproduction flag to "reproduced" in the voice service information table (S109). Further, the IVR server 4 sets a reproduction date/time.

Whereas if the registered telephone number is not coincident with the caller's telephone number in the voice service information table, the IVR server 6 returns the control to S105, and processes a next call received.

<Effects of the Embodiment>

As discussed above, according to this embodiment, the user, when applying for registering the membership, inputs the mobile telephone number of the mobile terminal 1 on the service providing site provided by the Web server 4, and then, dials the telephone of the data center, whereby the membership is formally registered. Namely, the member is authenticated by the telephone number of the mobile terminal 1.

Further, after the membership has once been registered, a necessary service is selected and can be provided by dialing the accept telephone number of the data center.

The data center providing the service can authenticate the user with the information such as the caller's telephone number of the mobile terminal that surely catches the user.

Moreover, according to the present information system, the Web server 4 obtains the mobile terminal ID of the mobile terminal 1, and records this terminal ID together with the mobile telephone number of the mobile terminal 1. On the other hand, the IVR server 6, when receiving the call from the mobile telephone number as the caller's telephone number, records the mobile terminal ID and the mobile telephone number of the mobile terminal 1 in the member information table. The mobile terminal ID is thereby registered as a membership number.

On the other hand, when the user requests the voice service, the Web server 4 obtains the mobile terminal ID of the mobile terminal 1, and searches for the mobile telephone number corresponding to the mobile terminal ID from the member information table. Then, the Web server 4 records the mobile telephone number and a menu item of the voice service selected by the user in the voice service information table. Further, when the user telephones the IVR server 6 through the mobile terminal 1, the IVR server 6 obtains the caller's telephone number of the call received. Then, when the caller's telephone number is registered in the voice service information table, the voice service selected above is provided.

Thus, the mobile terminal ID is utilized as the membership number, whereby the Web server 4 can obtain the mobile terminal ID as the membership number of the user without the user's inputting. It is therefore possible to omit the user's manual input of the membership number in providing the service.

<Modified Example>

In the embodiment discussed above, after inputting the telephone number when registering the membership, the link to the Web site is temporarily canceled, and thereafter the user dials the accept telephone number of the data center. For instance, however, if a mobile telephone company provides a phone-to-service as provided by NTT Docomo Co., Ltd., i.e., a service for dialing, when selecting a telephone number on the screen, directly this telephone number and also provides a tag set for generating such a screen, the user may select the telephone number displayed on the screen and may telephone the data center.

Further, in the case of telephoning the data center after selecting the message from the menu, such a service may also be utilized.

The embodiment described above has discussed the procedure of registering the membership and the procedure of providing the service after authenticating the member in the voice service. The embodiment of the present invention is not, however, limited to the voice service.

Namely, the present invention can be carried out in the general services provided to the users who access the sites through the mobile terminals 1. For instance, the present invention can be carried out in providing contents such as music, images, pictures, news, weather forecasts etc, in providing games and in providing application programs.

The discussion in the embodiment described above has been focused on the system for providing the service by exemplifying the mobile terminal 1. The embodiment of the present invention is not, however, confined to the mobile terminal 1. Namely, the present invention can be carried out also in a communication system for providing a function of linking to the Web sites through a fixed telephone such as L-mode services provided by NTT East Japan Co., Ltd. and NTT West Japan Co, Ltd.

According to the embodiment discussed above, the Web server 4 displays the message menu on the mobile terminal of the user and, after the user has selected the message, obtains the mobile terminal ID and further the registered telephone number (see S101 through S104 in FIG. 7). The present invention is not, however, limited to this procedure. For example, when the user accesses, the Web server 4 may obtain the mobile terminal ID and thereafter may display the message menu on the mobile terminal 1 of the user. Moreover, the Web server 4 may, after obtaining the registered telephone number, display the message menu on the mobile terminal 1 of the user.

According to the embodiment discussed above, the data center receives the phone call via ISDN. The embodiment of the present invention is not, however, restricted to this configuration. That is, the present invention is not limited to the types of lines on condition that the telephone lines capable of making the caller telephone number announce service utilizable.

The mobile terminal in the embodiment may be a mobile phone, a PHS terminal, PDA(Personal Digital(Data) Assistants) equipped with a telephone function. It may be called as a mobile device or a portable terminal.

What is claimed is:

1. A service system comprising:
   an application accept unit for accepting an application for registration of a service requester from a terminal together with said terminal's telephone number;
   a recording module for recording said terminal's telephone number as an application telephone number of the service requester;
   a telephone call receiving unit for receiving a telephone call;
   a comparing unit for comparing a terminal's telephone number of the received telephone call with the application telephone number of the service requester; and
   a registration module for registering, when the call's terminal telephone number is coincident with the application telephone number, the application telephone number of the service requester as a registered telephone number of the service requester.

2. A service system according to claim 1, further comprising:
   a request accept unit for accepting a service providing request given from said terminal; and
   a service providing unit for providing, when the call's terminal telephone number of the telephone call received by said telephone call receiving unit after accepting the request is coincident with the registered telephone number of said terminal, the service requested.

3. A service system according to claim 2, wherein the service is a service for providing sound or voices to said terminal.

4. A service system according to claim 1, further comprising an identifying information obtaining unit for obtaining terminal identifying information for identifying said terminal,
   wherein said recording module records the application telephone number together with the terminal identifying information, and said registration module registers the registered telephone number together with the terminal identifying information.

5. A service system according to claim 4, further comprising a request recording module for recording a service providing request given from said terminal,
   wherein said request accept unit obtains from said identifying information obtaining unit the terminal identifying information of said terminal making the service providing request, obtains the registered telephone number of said terminal from said registration module on the basis of the terminal identifying information, and makes said request recording module record the request given from said terminal together with the registered telephone number, and
   said service providing unit provides the requested service when the call's terminal telephone number of the call received by said telephone call receiving unit is coincident with any one of the registered telephone numbers recorded on said request recording module.

6. A service method comprising:
   accepting an application for registration of a service requester from a terminal together with said terminal's telephone number;
   recording said terminal's telephone number as an application telephone number of the service requester;
   receiving a first telephone call;
   comparing a terminal's telephone number of the received first telephone call with the application telephone number of the service requester; and
   registering, when the call's terminal telephone number is coincident with the application telephone number, the application telephone number of the service requester as a registered telephone number of the service requester.

7. A service method according to claim 6, further comprising:
   accepting a service providing request given from said terminal;
   receiving a second telephone call after accepting the request; and
   providing, when the call's terminal telephone number of the second telephone call is coincident with the registered telephone number of said terminal, the service requested.

8. A readable-by-computer recording medium recorded with a program for making a computer execute the steps of:
   accepting an application for registration of a service requester from a terminal together with said terminal's telephone number;
   recording said terminal's telephone number as an application telephone number of the service requester;
   receiving a first telephone call;
   comparing a terminal's telephone number of the received first telephone call with the application telephone number of the service requester; and
   registering, when the call's terminal telephone number is coincident with the application telephone number, the application telephone number of the service requester as a registered telephone number of the service requester.

9. A readable-by-computer recording medium recorded with a program according to claim 8, for making said computer further execute the steps of:

accepting a service providing request given from said terminal;

receiving a second telephone call after accepting the service providing request; and providing, when the call's terminal telephone number of the second telephone call is coincident with the registered telephone number of said terminal, the service requested.

10. A readable-by-computer recording medium recorded with a program according to claim 8, wherein said accepting the application involves obtaining terminal identifying information for identifying said terminal, said recording involves recording the application telephone number together with the terminal identifying information, and said registering involves registering the telephone number together with the terminal identifying information.

11. A readable-by-computer recording medium recorded with a program according to claim 10, wherein said accepting the service providing request involves obtaining the terminal identifying information of said terminal, obtaining a call's terminal telephone number from the terminal identifying information, and recording the service providing request together with the call's terminal telephone number, wherein said providing involves providing the requested service when the call's terminal telephone number of the second call received is coincident with the registered telephone number recorded together with the request given from said terminal.

* * * * *